US005113692A

United States Patent [19]

Kouta

[11] Patent Number: 5,113,692

[45] Date of Patent: May 19, 1992

[54] THROTTLE VALVE POSITION SIGNAL CORRECTING APPARATUS

[75] Inventor: Joji Kouta, Shizuoka, Japan

[73] Assignee: Jatco Corporation, Japan

[21] Appl. No.: 720,207

[22] Filed: Jun. 24, 1991

[30] Foreign Application Priority Data

Jun. 26, 1990 [JP] Japan .................................. 2-167761

[51] Int. Cl.[5] ............................................ G01M 15/00

[52] U.S. Cl. ........................................................ 73/117.3

[58] Field of Search ............................ 73/118.1, 117.3; 364/431.03, 431.04; 123/494

[56] References Cited

U.S. PATENT DOCUMENTS 4,581,924 4/1986 Otobe et al. ........................ 73/118.1

FOREIGN PATENT DOCUMENTS 1144451 10/1989 Japan .

*Primary Examiner*—Jerry W. Myracle

*Attorney, Agent, or Firm*—Ronald P. Kananen

[57] ABSTRACT

An apparatus for correcting a throttle valve position signal indicative of a sensed position of a throttle valve provided for controlling the amount of air permitted to enter engine cylinders. The sensed throttle valve position value sensed at an engine idling condition is set for an idle position value. A first error of the idle position value from a first reference value corresponding to a throttle valve idle position designed for an air conditioning unit being not operating. The first error is used to correct a sensed throttle valve position when the air conditioning unit is not operating. A second error of the idle position value from a second reference value corresponding to a throttle valve idle position desired for the air conditioning unit being operating. The second error is used to correct a sensed throttle valve position when the air conditioning unit is operating.

8 Claims, 3 Drawing Sheets

THROTTLE VALVE POSITION SIGNAL CORRECTING APPARATUS

BACKGROUND OF THE INVENTION

This invention relates to a throttle valve position signal correcting apparatus for use with an automotive vehicle having an automatic transmission and an internal combustion engine from which a drive is transmitted to the automatic transmission.

Throttle valve position sensors have been used to sense a position of an throttle valve provided for controlling the amount of air permitted to enter to engine cylinder. The sensed throttle valve position is used to control the engine and transmission. For example, Japanese Utility Model Kokai No. 1-144451 discloses a conventional apparatus for correcting the throttle valve position signal to absorb throttle sensor characteristic variations and errors occurring when the throttle valve is assembled in the engine. The conventional apparatus is arranged to use a value of the throttle valve position signal sensed when the engine speed remains in a predetermined range for a time longer than a predetermined value to correct the throttle valve position signal. However, the conventional apparatus fails to provide an appropriate correction when an accessory such as an air conditioning unit or the like operable on power from the engine. When the air conditioning unit is operating, a fast idle unit operates to hold the throttle valve at a fast idle (somewhat open) position so as to increase the engine idling speed at engine idle conditions. For this reason, the throttle valve position signal value sensed when the engine is judged to be idling with the air conditioning unit being operating is different from the throttle valve position signal value sensed when the engine is judged to be idling with the air conditioning unit being not operating. If the throttle valve position signal is corrected with the air conditioning unit being operating, the corrected throttle valve position signal indicates a throttle valve position smaller than the actual throttle valve position. Consequently, the corrected throttle valve position is not suitable for transmission position change and line pressure controls.

SUMMARY OF THE INVENTION

Therefore, a main object of the invention is to provide an improved throttle valve position signal correcting apparatus which can provide an accurate throttle valve position signal correction irrelevant of whether or not fast idle control is performed.

There is provided, in accordance with the invention, a throttle valve position signal correcting apparatus for use with an automotive vehicle including a transmission, an internal combustion engine having engine cylinders, a throttle valve located within an engine induction passage for controlling the amount of air permitted to enter the engine cylinders, a throttle position sensor sensitive to a position of the throttle valve for producing a signal indicative of a sensed throttle valve position, and at least one accessory operable on power from the engine. The apparatus comprises first means for producing an engine idling signal when the engine is idling, second means for producing an accessory operation signal when the accessory is operating, third means responsive to the engine idling signal for setting the sensed throttle valve position for an idle position value, fourth means for calculating a first error of the idle position value from a first reference value in the absence of the accessory operation signal, the first reference value corresponding to a throttle valve idle position designed for the accessory being not operating, the fourth means including means for calculating a second error of the idle position value from a second reference value in the presence of the accessory operation signal, the second reference value corresponding to a throttle valve idle position designed for the accessory being operating, and fifth means for correcting a sensed throttle valve position based upon the calculated first error in the absence of the accessory operation signal, the fifth means including means for correcting a sensed throttle valve position based upon the calculated second error in the presence of the accessory operation signal.

In another aspect of the invention, the throttle valve position signal correcting apparatus comprises first means for producing an engine idling signal when the engine is idling, second means for producing an accessory operation signal when the accessory is operating, third means responsive to the engine idling signal for setting the sensed throttle valve position for an idle position value, fourth means responsive to the accessory operating signal for preventing the throttle valve to close over a fast idle position advanced with respect to an idle position, fifth means for calculating a first error of the idle position value from a first reference value in the absence of the accessory operation signal, the first reference value corresponding to a designed value of the throttle valve idle position, the fifth means including means for calculating a second error of the idle position value from a second reference value in the presence of the accessory operation signal, the second reference value corresponding to a designed value of the throttle value idle position, and sixth means for correcting a sensed throttle valve position based upon the calculated first error in the absence of the accessory operation signal, the sixth means including means for correcting a sensed throttle valve position based upon the calculated second error in the presence of the accessory operation signal.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
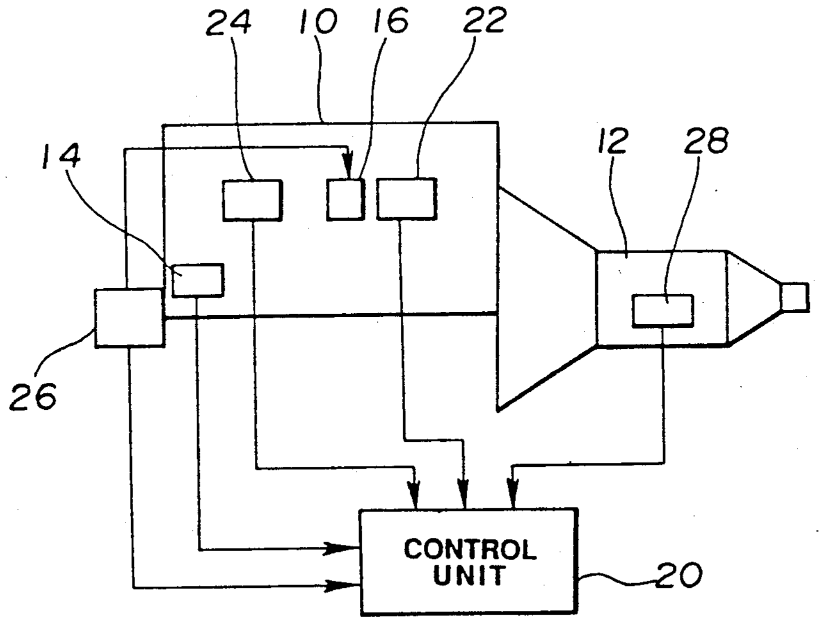
FIG. 1 is a schematic diagram showing one embodiment of a throttle valve position signal correcting apparatus made in accordance with the invention.

With reference to the drawings, and in particular to FIG. 1, there is shown one emboidment of a throttle position signal processing apparatus made in accordance with the invention applicable to an automotive vehicle installed with an internal combustion engine 10, an automatic transmission 12, and an accessory such as an air conditioning unit 14. The engine 10 includes a throttle valve (not shown) provided for movement within an engine induction passage to control the amount of air permitted to enter the engine cylinders.

The throttle valve is associated with an accelerator pedal. The degree of rotation of the throttle valve is manually controlled by the operator of the automotive vehicle. The drive from the engine 10 is transmitted to the driving wheels (not shown) through the automatic transmission 12. The numeral 16 designates a fast idle unit which operates to open the throttle valve, independently from the accelerator pedal, in response to operation of the air conditioning unit 14. The fast idle unit 16 prevents the throttle valve to close over a fast idle position advanced with respect to an idle position.

The numeral 20 designates a control unit which corrects a throttle valve position signal fed thereto from a throttle valve position sensor 22 based upon inputs fed thereto from various sensors including an engine speed sensor 24, an air conditioner switch 26, and a selected position switch 28. The throttle valve position sensor 22 preferably is a potentiometer electrically connected in a voltage divider circuit for supplying a DC voltage proportional to throttle valve position. The throttle valve position signal (DC voltage) is fed from the throttle valve position sensor 22 to the control unit 20. Preferably, the engine speed sensor 24 employs a counter which counts a series of crankshaft position electrical pulses of a repetition rate directly proportional to engine speed and produces an engine speed signal indicative of the speed of rotation of the engine. The engine speed signal is fed from the engine speed sensor 24 to the control unit 20. The air conditioner switch 26 closes to supply current from the engine battery to the fast idle unit 16 and also to the control unit 20 when the air conditioning unit 14 is operating. The selected position switch 28 produces a selected position signal (SP) indicative of an selected position of the automatic transmission 12. The selected position signal is fed from the selected position switch 28 to the control unit 20.

The control unit 20 employs a digital computer which includes a central processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from various sensors and converts them into digital form for application to the central processing unit. The read only memory contains the program for operating the central processing unit.

Figure 2:
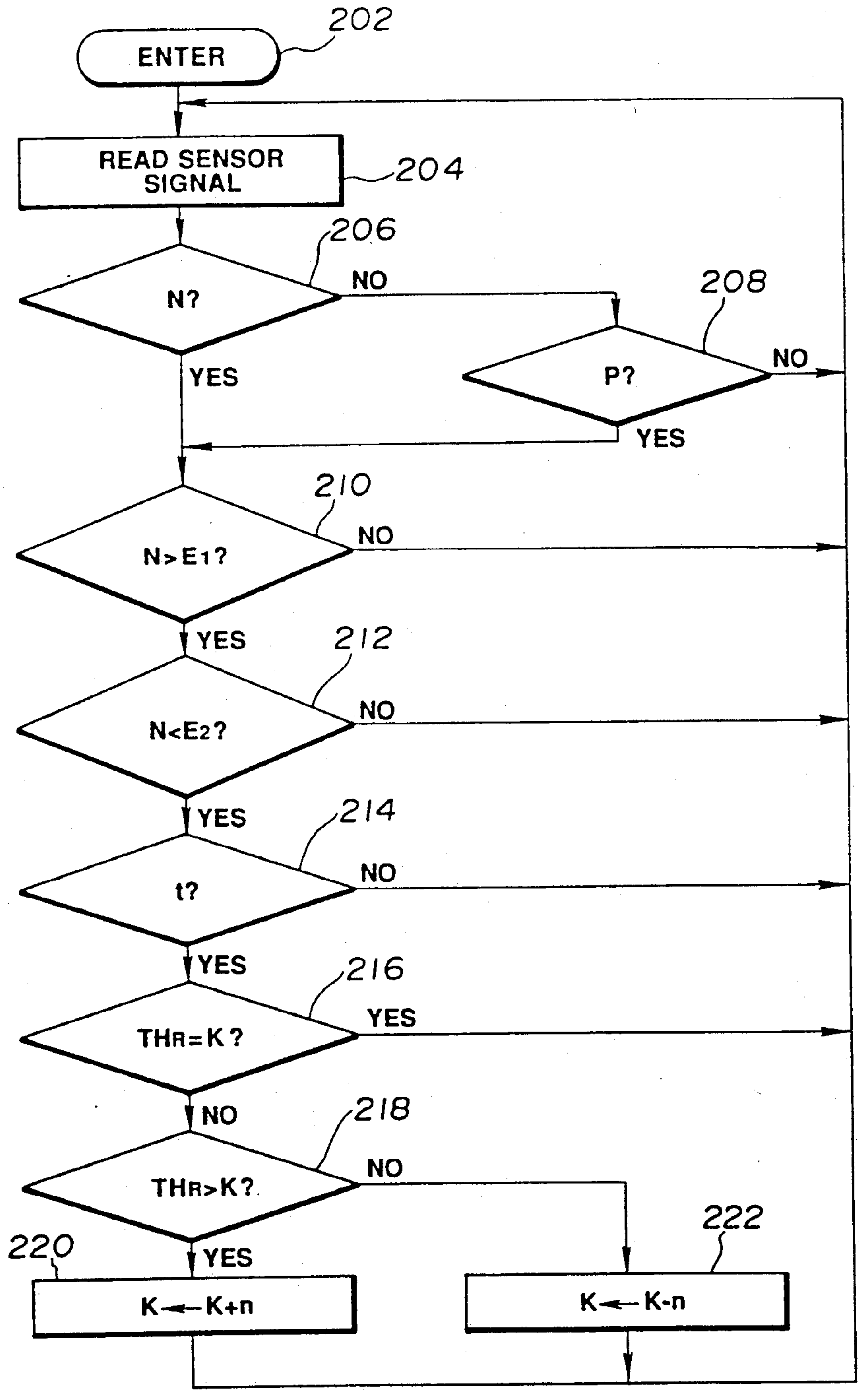
FIG. 2 is a flow diagram showing the programming of the digital computer as it is used to calculate an idle position value.

FIG. 2 is a flow diagram showing the programming of the digital computer as it is used to calculate an idle position value K. The computer program is entered at the point 202 in response to a command for correcting the throttle valve position signal. At the point 204 in the program, the various sensor signals are, one by one, read into the computer memory. At the point 206 in the program, a determination is made as to whether or not the "neutral" position N is selected. If the answer to this question is "yes", then the program proceeds to the point 210. Otherwise, the program proceeds another determination step at the point 108. This determination is as to whether or not the "park" position P is selected. If the answer to this question is "no", then the program is returned to the point 204. Otherwise, the program proceeds to the point 210.

At the point 210 in the program, a determination is made as to whether or not the sensed engine speed N is greater than a predetermined lower limit E1. If the answer to this question is "no", then the program is returned to the point 204. Othewise, the program proceeds to another determination step at the point 212. This determination is as to whether or not the sensed engine speed N is less than a predetermined upper limit E2. If the answer to this question is "no", then the program is returned to the point 204. Otherwise, it means that the sensed engine speed N is within a predetermined engine idling speed range defined by the lower and upper limits E1 and E2 and the program proceeds to the point 214.

At the point 214 in the program, a determination is made as to whether or not the period of time during which the sensed engine speed N remains within the engine idling speed range exceeds a predetermined value t. If the answer to this question is "no", then the program is returned to the point 204. Otherwise, it means that the engine 10 is idling and the program proceeds to another determination step at the point 218. This determination is as to whether or not the sensed throttle valve position THR is equal to an idle position value K. An initial value, stored previously in the computer memory, is used as the idle position value in the first cycle of execution of this program. If the answer to the question is "yes", then the program is returned to the point 204. Otherwise, the program proceeds to another determination step at the point 218. This determination is as to whether or not the sensed throttle valve position THR is greater than the idle position value K. If the answer to this question is "yes", then the program proceeds to the point 220 where a predetermined value n is added to the idle position value K. The added value is stored to update the idle position value K. Following this, the program is returned to the point 204. If the answer to the question inputted at the point 218 is "no", then the program proceeds to the point 222 where the predetermined value n is subtracted from the idle position value K. The subtracted value is stored to update the idle position value K. Following this, the program is returned to the point 204.

As can be seen from FIG. 2, the idle position value K is brought closer to the sensed throttle valve position value THR in each cycle of execution of the program when the automatic transmission 12 is in "neutral" or "park" position and when the sensed engine speed remains within a predetermined idling speed range for a time greater than a predetermined time t. Thus, the idle position value K is equal to the throttle valve position sensed during engine idling.

Figure 3:
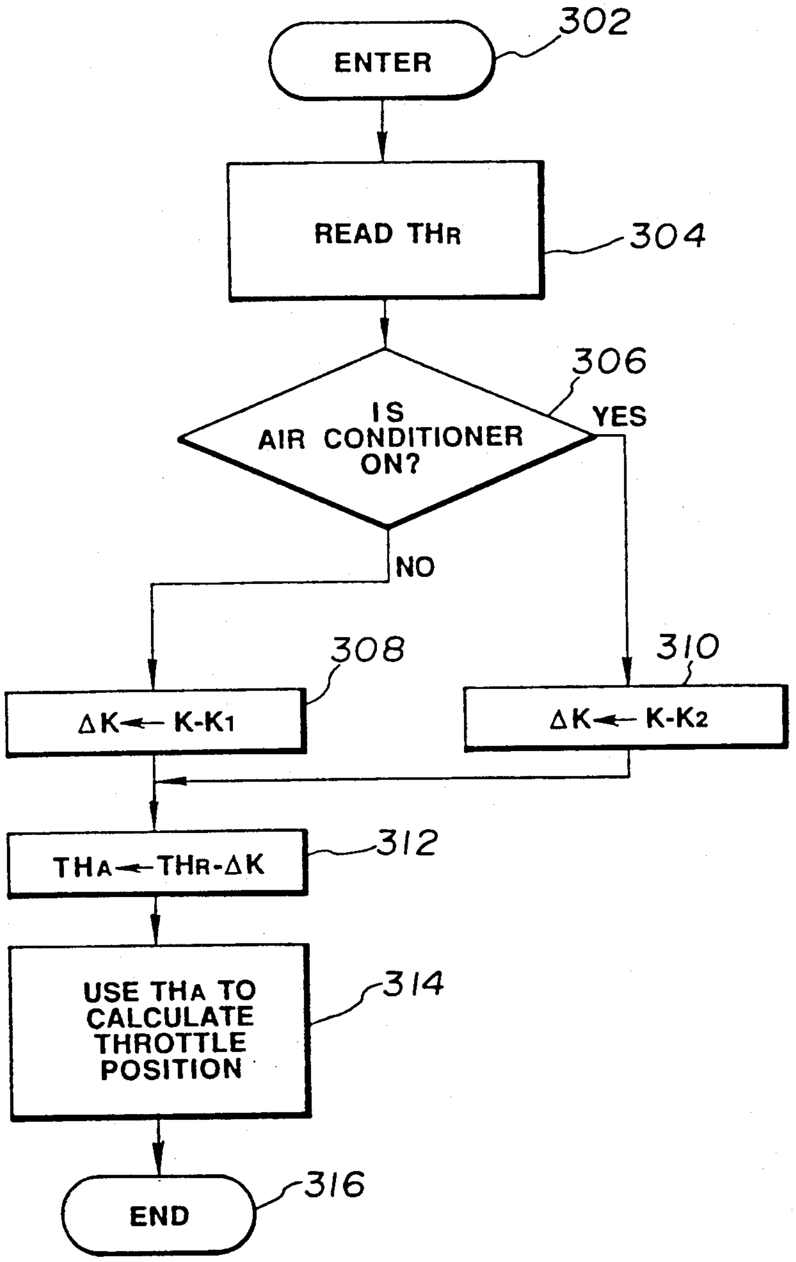
FIG. 3 is a flow diagram showing the programming of the digital computer as it is used to correct the throttle valve position signal.

FIG. 3 is a flow diagram of the programming of the digital computer as it is used to correct the throttle valve position signal. The computer program is entered at the point 302. At the point 304 in the program, the throttle valve position signal is read into the computer memory. At the point 306 in the program, the determination is made as to whether or not the air conditioning unit 14 is operating. This determination is made based upon the signal fed from the air conditioner switch 26. If the answer to this question is "no", then the program proceeds to the point 308 where a first reference value K1 is subtracted from the idle position value K calculated during the program of FIG. 2 to provide a first error ΔK. The first reference value K1 corresponds to an idle (or fully-closed) throttle valve position designed for the fast idle unit 16 being not operating. The program then proceeds to the point 312. If the answer to the question inputted at the point 306 is "yes", then the program proceeds to the point 310 where a second reference value K2 is subtracted from the idle position value K calculated during the execution of the program of FIG. 2 to provide a second error ΔK. The second reference value K2 corresponds to an idle (or fast idle) throttle valve position designed for the fast idle unit 16 being operating. The program then proceeds to the point 312.

At the point 312 in the program, the central processing unit corrects the sensed throttle valve position by subtracting the first error ΔK from the sensed throttle valve position THR to provide a difference THA when the fast idle unit 16 is not operating) or by subtracting the second error ΔK from the sensed throttle valve position THR to provide a difference THA when the fast idle unit 16 is operating. The program then proceeds to the point 314 where the calculated difference THA is used to calculate a throttle valve position value, which is used to control the gear position change of the automatic transmission 12, from a relationship programmed into the computer. Following this, the program proceeds to the end point 316.

It is to be understood that the difference THA calculated when the air conditioning unit 14 is not operating is equal to the difference THA calculated when the air conditioning unit 14 is operating. It is, therefore, possible to provide an accurate throttle valve position signal correction irrelevant of whether or not the air conditioning unit 16 is operating, that is, irrelevant of whether the fast idle unit 16 is operating. If an additional accessory is employed in the automotive vehicle, the throttle valve position signal may be corrected in a similar manner with an initial value of the idle position value K being set at an appropriate value for the additional accessory.

What is claimed is:

1. For use with an automotive vehicle including a transmission, an internal combustion engine having engine cylinders, a throttle valve located within an engine induction passage for controlling the amount of air permitted to enter the engine cylinders, a throttle position sensor sensitive to a position of the throttle valve for producing a signal indicative of a sensed throttle valve position, and at least one accessory operable on power from the engine, an apparatus for correcting the throttle valve position signal, comprising:

- first means for producing an engine idling signal when the engine is idling;
- second means for producing an accessory operation signal when the accessory is operating;
- third means responsive to the engine idling signal for setting the sensed throttle valve position for an idle position value;
- fourth means for calculating a first error or the idle position value from a first reference value in the absence of the accessory operation signal, the first reference value corresponding to a throttle valve idle position designed for the accessory being not operating, the fourth means including means for calcuating a second error of the idle position value from a second reference value in the presence of the accessory operation signal, the second reference value corresponding to a throttle valve idle position designed for the accessory being operating; and
- fifth means for correcting a sensed throttle valve position based upon the calculated first error in the absence of the accessory operation signal, the fifth means including means for correcting a sensed throttle valve position based upon the calculated second error in the presence of the accessory operation signal.

2. The throttle valve position signal correcting apparatus as claimed in claim 1, wherein the first means includes means sensitive to an engine speed for producing a signal indicative of a sensed engine speed, and means for producing the engine idling signal when the sensed engine speed remains within a predetermined idling speed range for a time greater than a predetermined time.

3. The throttle valve position signal correcting apparatus as claimed in claim 2, wherein the first means produces the engine idling signal only when the transmission is in either of neutral and park positions.

4. The throttle valve position signal correcting apparatus as claimed in claim 1, wherein the accessory is an air conditioning unit.

5. For use with an automotive vehicle including a transmission, an internal combustion engine having engine cylinders, a throttle valve located within an engine induction passage for controlling the amount of air permitted to enter the engine cylinders, a throttle position sensor sensitive to a position of the throttle valve for producing a signal indicative of a sensed throttle valve position, and at least one accessory operable on power from the engine, an apparatus for correcting the throttle valve position signal, comprising:

- first means for producing an engine idling signal when the engine is idling;
- second means for producing an accessory operation signal when the accessory is operating;
- third means responsive to the engine idling signal for setting the sensed throttle valve position for an idle position value;
- fourth means responsive to the accessory operating signal for preventing the throttle valve to close over a fast idle position advanced with respect to an idle position;
- fifth means for calculating a first error of the idle position value from a first reference value in the absence of the accessory operation signal, the first reference value corresponding to a designed value of the throttle valve idle position, the fifth means including means for calculating a second error of the idle position value from a second reference value in the presence of the accessory operation signal, the second reference value corresponding to a designed value of the throttle valve idle position; and
- sixth means for correcting a sensed throttle valve position based upon the calculated first error in the absence of the accessory operation signal, the sixth means including means for correcting a sensed throttle valve position based upon the calculated second error in the presence of the accessory operation signal.

6. The throttle valve position signal correcting apparatus as claimed in claim 5, wherein the first means includes means sensitive to an engine speed for producing a signal indicative of a sensed engine speed, and means for producing the engine idling signal when the sensed engine speed remains within a predetermined idling speed range for a time greater than a predetermined time.

7. The throttle valve position signal correcting apparatus as claimed in claim 6, wherein the first means produces the engine idling signal only when the transmission is in either of neutral and park positions.

8. The throttle valve position signal correcting apparatus as claimed in claim 5, wherein the accessory is an air conditioning unit.

* * * * *